United States Patent
Cunningham

(10) Patent No.: US 7,407,900 B2
(45) Date of Patent: *Aug. 5, 2008

US007407900B2

(54) UNIQUE BALLISTIC COMPOSITION

(75) Inventor: David Verlin Cunningham, Mississauga (CA)

(73) Assignee: Barrday, Inc., Cambridge, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/558,825

(22) PCT Filed: May 27, 2004

(86) PCT No.: PCT/CA2004/000779

§ 371 (c)(1),
(2), (4) Date: Aug. 17, 2006

(87) PCT Pub. No.: WO2004/106838

PCT Pub. Date: Dec. 9, 2004

(65) Prior Publication Data

US 2007/0010151 A1    Jan. 11, 2007

Related U.S. Application Data

(60) Provisional application No. 60/474,519, filed on May 29, 2003.

(51) Int. Cl.
*B32B 27/12* (2006.01)
*B32B 7/02* (2006.01)

(52) U.S. Cl. .............. 442/135; 442/134; 442/286; 442/290; 428/105; 428/119; 428/212; 428/911; 2/2.5; 89/36.01; 89/36.02; 89/36.05

(58) Field of Classification Search .......... 442/134, 442/135, 286, 290, 134.135; 428/105, 119, 428/212, 911; 2/2.5; 89/36.01, 36.02, 36.05
See application file for complete search history.

(56) References Cited

U.S. PATENT DOCUMENTS

| | | | |
|---|---|---|---|
| 3,000,772 A | 9/1961 | Lunn | |
| 3,956,447 A | 5/1976 | Denommee | |
| 4,574,105 A | 3/1986 | Donovan | |
| 4,623,514 A | 11/1986 | Arora et al. | |
| 4,678,702 A | 7/1987 | Lancaster et al. | |
| 5,437,905 A | 8/1995 | Park | |
| 5,443,882 A | 8/1995 | Park | |
| 5,443,883 A | 8/1995 | Park | |
| 5,547,536 A | 8/1996 | Park | |
| 5,635,288 A | 6/1997 | Park | |
| 5,677,029 A | 10/1997 | Prevorsek et al. | |
| 5,935,678 A | 8/1999 | Park | |
| 5,958,804 A * | 9/1999 | Brown et al. | 442/192 |
| 6,562,435 B1 * | 5/2003 | Brillhart et al. | 428/105 |
| 6,668,868 B2 * | 12/2003 | Howland et al. | 139/383 R |
| 6,841,492 B2 * | 1/2005 | Bhatnagar et al. | 442/135 |

FOREIGN PATENT DOCUMENTS

| | | |
|---|---|---|
| EP | 0 683 374 | 3/1995 |
| WO | WO 02/14408 | 2/2002 |
| WO | WO 02/090866 | 11/2002 |

* cited by examiner

*Primary Examiner*—Ula C Ruddock
(74) *Attorney, Agent, or Firm*—Michael I. Stewart; Sim & McBurney

(57) ABSTRACT

A ballistic composite comprises multiple layers of a fabric having unidirectional ballistic resistant yarns in at least two layers and a resin layer between each pair of such multiple layers adhered to the ballistic resistant yarns but not encapsulation the same and not penetrating the layer of fabric. The ballistic yarn layers are at 90°±5° with respect to each other and the ballistic resistant yarns are stabilized by being woven in a second fabric. The second fabric is formed of yarns having a substantially lower tenacity and tensile modulus than the ballistic resistant yarn. The ballistic resistant yarns have a tenacity of at least about 15 grams per denier and a modulus of at least about 40 grams per denier. The resin in the resin layer has a modulus of at least about 7000 psi.

22 Claims, No Drawings

UNIQUE BALLISTIC COMPOSITION

REFERENCE TO RELATION APPLICATIONS

This application is a U.S. National Phase filing under 35 USC 371 of PCT/CA2004/000779 filed May 27, 2004 claiming priority under 35 USC 119(e) from U.S. Provisional Patent Application No. 60/474,519 filed May 29, 2003.

FIELD OF INVENTION

The present invention relates to ballistic resistant composites.

BACKGROUND TO THE INVENTION

The use of flexible resins with fabrics woven from high performance fibers to fabricate composite armor panels has been the subject of much research and many patents. The general consensus of this body of work is that the more flexible the resin system used in the fabrication of the composite, the better the ballistic properties of the resulting panel. In addition, adhesion of the resin to the ballistic yarn should be sufficiently poor that delamination in the composite occurs during the ballistic event. This requirement can be ignored if the resin in the composite ruptures at a sufficiently low strength to allow energy to dissipate during the ballistic event. Given this basic knowledge of armor design, the design of an armor laminate then becomes a tradeoff of ballistic properties of the panel against the structural requirements for the use of the panel, U.S. Pat. No. 3,000,772, Lunn, 1961, is one of the first patents to discuss the requirement for a flexible resin system for superior ballistic performance. This patent covers the use of a polyethylene film with a unidirectional glass fabric. The glass fabric has glass yarn in the warp direction and a secondary yarn in the fill direction to form the fabric. The fabric then pressed into a laminate after orienting succeeding layers of fabric at 90 degrees to the fabric layer above and below it. This is a standard practice known as "cross plying" the layers. U.S. Pat. No. 3,956,447, Denommnee, 1976, discusses the fabrication of a ballistic helmet for the US military using a thermoset or thermoplastic resin. In this patent, the preferred resin system for the helmet is a PVB/phenolic system. Roy Liable, a researcher at the US Army's Research, Engineering and Development Center in Natick, Mass., in his book, *Ballistic Materials and Penetration Mechanics*, Elsevier Scientific Publishing Company, 1980, page 108, discusses that, during the helmet development, it was discovered that the phenolic resin by itself was too stiff to produce good ballistic results and that the PVB component of the system was added to introduce some elongation and flexibility into the resin to improve the ballistic properties while maintaining the rigidity required of a helmet.

Several patents cover the use of thermoplastic resins and films in the composites. Lancaster et al, U.S. Pat. No. 4,678,702, 1987, teaches the use of Surlyn as the resin where a Surlyn film form flows into the woven fabric under heat and pressure to encapsulate the yarn and form flexible ballistic composite. Donavan, U.S. Pat. No. 4,574,105, 1986, teaches the use of alternating layers of nylon and Kevlar where the nylon adheres to the woven Kevlar under heat and pressure to form the composite but the nylon does not penetration the fabric. A series of patents by Andrew Park (U.S. Pat. Nos. 5,437;905; 5,443,882; 5,443,883; 5,547,536; 5,635,288; 5,935,678) covers the use of films between the layers of unidirectional yarn where the film is used to hold cross-plied layers of the yarn together without substantially penetrating the layers. Allied-Signal, U.S. Pat. No. 4,623,514, cover the substantial encapsulation of high performance yarns in cross-plied layers of unidirectional yarns with a resin with modulus less than 6000 psi.

SUMMARY OF INVENTION

The subject of this patent application is the use of thermoplastic resins with a unique fabric to produce a superior ballistic resistant composite. The resins have good adhesion to the ballistic resistant yarns and high tensile modulus. This combination of properties, when used with a conventional woven fabric or a cross-plied unidirectional fabric, would not result in a superior ballistic composite. The unique fabric of this invention is the subject of a U.S. patent application Ser. No. 10/135,573 filed May 1, 2002 (WO 02/090866), assigned to the assignee hereof and the disclosure of which is incorporated herein by reference. This fabric is a quasi-unidirection at fabric with the ballistic yarns held in a 0/90 unidirectional orientation by a low modulus, high elongation yarn of relatively small diameter. This fabric is sold by Barrday Inc., the assignee hereof, under the trade name Sentinel fabrics. The ballistic yarn woven in this fabric may be any high strength yarn with a tenacity of at least about 15 grams per denier and a modulus of at least about 400 grams per denier. All of the commercially-available ballistic resistant yarns have been woven into Sentinel fabrics. The available resins that perform adequately in this invention are any resin which will adhere to the high performance yarns and have a modulus of at least about 7,000 psi. Ballistic resistant composites have not previously been constructed using resin having such modulus values, including those described in the aforementioned 10/135,573 (WO 02/090866).

In one aspect of the present invention, there s provided a ballistic resistant composite comprising multiple layers of a fabric having unidirectional ballistic resistant yarns in at least two layers, the ballistic yarn layers being at 90°±5° with respect to each other, the ballistic resistant yarns being stabilized by being woven in a second fabric, the second fabric being formed of yarns having a substantially lower tenacity and tensile modulus than the ballistic resistant yarn, the ballistic resistant yarn having a tenacity of at least about 15 grams per denier and a modulus of at least about 40 grams per denier, and a resin layer between each pair of such multiple layers adhered to the ballistic resistant yarns but not encapsulating the same and not penetrating the layer of fabric, the resin in the resin layer having a modulus of at least about 7000 psi.

GENERAL DESCRIPTION OF INVENTION

The basic requirement that the yarns be free to move and that the composite delaminate during the ballistic event has not been ignored in this invention. Rather the freedom for the yarn to move and for the composite to delaminate has been provided by the low modulus encapsulating yarn of the Sentinel fabric rather than the resin system between the fabric layers. Two layers of the very inflexible ballistic yarns, strongly adhered together, produce a rigid but very thin composite. A stack of such thin, rigid layers, even when the rigid layers are bonded by a flexible yarn produces a rigid, hard composite. In a composite composed of Sentinel fabric layers, one of the layers of yarn of this bonded pair is the top unidirectional layer of a Sentinel fabric and the other strongly adhered yarn layer is the bottom layer of a second Sentinel fabric. In the present invention, the Sentinel fabrics are layered with the same surface up and the fabrics are all oriented with the warp yarns in the same direction. This arrangement results in a composite with the adjacent unidirectional ballistic yarn oriented 0/90 degrees. The resin adheres together adjacent fabric layers forming rigid layers of laminated 0/90 layers. These laminated 0/90 layers are connected by the low modulus encapsulating yarn to the layer above and below it. The integrity and properties of the resulting composite is determined by the resin, the amount of resin and the encapsulating yarns.

The flexible encapsulating yarn provides the required movement and delamination of the composite layers and allows the use of resins and adhesives with more aggressive adhesion than that previously seen in ballistic composites. The flexible encapsulating yarn also allows the use of resins and adhesives with much higher tensile modulus than previously employed. The strength of the delamination layer can controlled by the encapsulating yarn while the stiffness and hardness of the composite is determined by the type and amount of the thermoplastic resin and its adhesion to the fibers. The use of a high modulus resin having a modulus of at least about 7,000 psi, preferably in the range of about 25,000 to about 30,000 psi, with an aggressive bond to the yarn requires that the resin not penetrate the fabric nor substantially encapsulate the ballistic yarn. Should either of these occur the freedom of the ballistic yarn to move is impaired and the ability of the yarn to dissipate energy is substantially impaired.

The placement of the resin between the layers of the Sentinel fabrics can be controlled by several means. One method is to restrict the amount of resin used such that there is insufficient resin to wet more than the surface of the fabrics. In general, the amount of resin used is less than about 20 wt % of the weight of the composite. To produce a rigid composite with such a low amount of resin requires that the resin adhere very, very well to the ballistic yarn. The stiffness in the composite is then provided by two layers of high modulus yarns strongly adhered together. A second method is to use a resin with a high viscosity such that it does not flow at the temperature required for adhesion. Many resins in film form meet this requirement. Low density polyethylene is one of those films. The low density polyethylene softens and adheres to Sentinel fabrics woven with ultra high molecular weight polyethylene yarns but it does not substantially penetrate the fabric at the temperature required for adhesion. The ultra high molecular weight polyethylene in this case includes ballistic yarns of the type described in more detail below and sold under the trade name Spectra and Dyneema. Other films; including thermoplastic nylon films and ionomer and polyurethane films, perform in a similar fashion.

The ability to control the stiffness and the hardness of the laminate while maintaining the ballistic performance has several advantages. When the threat to be stopped is a relatively deformable threat, such a 9 mm bullet, a hard laminate will deform the bullet more than a soft laminate and the larger deformed bullet is usually easier to stop. Similarly a relatively non-deforming bullet, such as a steel jacketed Tokarev bullet, is more easily stopped with a more flexible laminate where the bullet is more gradually stopped. The laminate may also be fabricated with layers of different hardness or stiffness. An example of this structure is a two component laminate used to back a ceramic armor plate. A stiff, hard laminate layer is placed directly behind the ceramic plate where it provides support to the ceramic during the ballistic event. The softer layers of the laminate form the back of the composite and absorb energy by delamination and thus minimize the energy transferred to the wearer of the armor plate.

The fabric layers used in the composite of the present invention have two unidirectional yarn layers at about 90 degrees to one another, stabilized by a second woven fabric and are fully described in the aforementioned U.S. patent application Ser. No. 10/135,573 (WO 02/090866).

The ballistic resistant yarns used herein have a tenacity of about 15 grams per denier and a tensile modulus of at least about 400 grams per denier. Examples of ballistic resistant yarns which may be used herein are aramid fibers, extended chain polyethylene fibers, poly(p-phenylene-2,6-benzobisoxazole) (PBO) fibers and glass fibers. Aramid and copolymer aramid fibers are produced commercially by Du Pont, Twaron Products and Teijin under the trade names Kevlar®, Twaron® and Technora®, respectively. Extended chain polyethylene fibers are produced commercially by Honeywell, DSM, Mitsui and Toyobo under the trade names Spectra®, Dyneena® and Telemilon® respectively. Polyethylene fiber and film are produced by Synthetic Industries and sold under the trade name Tensylon®. PBO is produced by Toyobo under the trade name Zylon®. Liquid crystal polymers are produced by license under the trade name Vectron®. Other ballistic yarns may be used.

The stabilizing fibers, which may also be referred to as encapsulating yarns, may be selected from a wide range of fibers. Such fibers include natural fibers, such as cotton, wool, sisal, linen, jute and silk. The fibers also include manmade fibers and filaments, such as regenerated cellulose, rayon, polynosic rayon and cellulose esters. The fibers further include synthetic fibers and filaments, such as acrylics, for example, polyacrylonitrile, modacrylics, such as acrylonitrile-vinyl chloride copolymers, polyamide, for example, polyhexamethylene adipamide (nylon 66), polycaproamide (nylon 6), polyundecanoamide (nylon 11), polyolefin, for example, polyethylene and polypropylene, polyester, for example, polyethylene terephthalate, rubber, synthetic rubber and saran. Glass fiber also may be used. Denier of the encapsulating yarn may ranger from about 20 to about 1000 denier, depending on the sizes of the ballistic resistant fibers. In general, the encapsulating yarn has a diameter of up to about 14% of the diameter of the ballistic yarn, preferably about 2.5%. The encapsulating yarn generally has a maximum tensile modulus of 1777 grams per tex and a maximum strength at 3% elongation that is about 0.31% of the ballistic yarn.

In the fabric, the yarn count of the ballistic yarn per inch is about 40 to about 85%, preferably 50% plus or minus one, of the maximum tightness that can be woven in a plain weave fabric composed entirely of the same size ballistic yarn.

In the preferred embodiment of this invention, the fiber used is a high modulus polyethylene yarn (Spectra fiber) or polyaramid yarn (Kevlar fabric) having a tenacity of at least about 15 grams per denier and a tensile modulus of at least about 400 gram per denier and the resin is a low density polyethylene film, preferably with a density of about 0.92 to about 0.94 g/m$^3$. The adhesion of low density polyethylene to high modulus extended chain polyethylene fibers is very good and cannot be explained by mere mechanical adhesion. The film appears to bond or diffuse into the structure of the extended chain. The laminate constructed of Spectra and low density polyethylene film shows remarkable improvements in performance over prior art structures. The total thickness of the low density polyethylene film may have a thickness of

EXAMPLES

Example 1

This Example is a comparative Example.

A plain weave Sentinel fabric, Barrday style number 4850, woven with 1200 denier Spectra® 900 yarns was coated with a thermoplastic block copolymer, Kraton 1107D. The fabric had a pick count of 16×16 and an areal density of 184 g/m². This resin is the most common resin used in Spectra armor laminates and has a modulus of less than 6,000 psi. The Kraton coating was 18% by weight. A 16"×16" laminate was fabricated using this coated fabric by consolidating 18 layers in a heated hydraulic press. The material was pressed at 150 PSI for 30 minutes at a temperature of 240 degrees Fahrenheit. The panel was cooled to 180 degrees Fahrenheit before the pressure was released. The finished composite was mounted in bracket and shot with no backing material with a 9 mm full metal jacket bullet. The V-50 of the panel was determined. The V-50 is the velocity where the probability of the bullet either stopping in the panel or passing through the panel was determined. The V-50 value is a common measure of the ballistic resistance of the panel and is known to those familiar to armor design. It is the velocity at which 50% of a given type of projectile, when striking the panel, will completely penetrate the target. The V50 of the panel was 1253 ft/sec.

Example 2

This Example illustrates-one embodiment of the invention.

18 layers of the fabric used in Example 1 were laminated with three layers of 0.35 mil low density polyethylene (PE) film between each layer of fabric. The low density polyethylene film had a density of 0.92 g/m³ and a modulus of 25,000 to 29,000 psi. The material was pressed at 150 PSI for 30 minutes at a temperature of 240 degrees Fahrenheit. The panel was cooled to 180 degrees Fahrenheit before the pressure was released. The finished composite was mounted in bracket and shot with no backing material with a 9 mm full metal jacket bullet The V-50 performance of the panel was determined. The V50 of the panel determined to be 1440 ft/sec., significantly high than the V-50 of Example 1.

Example 3

This Example illustrates a further embodiment of the invention.

18 layers of the fabric used in Example 1 were laminated with one layer of 0.35 mil PE film between each layer of fabric. The PE film had the same properties as specified in Example 2. The material was pressed at 150 PSI for 30 minutes at a temperature of 240 degrees Fahrenheit The panel was cooled to 180 degrees Fahrenheit before the pressure was released. The finished composite was mounted in bracket and shot with no backing material with a 9 mm full metal jacket bullet The V-50 of the panel was determined. The V50 of the panel determined to be 1516 ft/sec. The V-50 of this panel was significantly high than the V-50 of Example 1.

Example 4

This Example illustrates a further embodiment of the invention.

34 layers of a Sentinel fabric woven with 650 denier Spectra 1000 yarn were laminated with one layer of 0.35 mil PE film between each layer of fabric. The PE film had the same properties as specified in Example 2. The material was pressed at 150 PSI for 30 minutes at a temperature of 240 degrees Fahrenheit. The panel was cooled to 180 degrees Fahrenheit before the pressure was released. The finished composite was mounted in bracket and shot with no backing material with a 9 mm full metal jacket bullet. The V-50 of the panel was determined. The V50 of the panel determined to be 1699 ft/sec.

Example 5

This Example illustrates an additional embodiment of the invention.

34 layers of the same Sentinel fabric as in Example 4, woven with 650 denier Spectra 1000 yarn, were laminated with three layers of 0.35 mil PE film between each layer of fabric. The PE film had the same properties as specified in Example 2. The material was pressed at 150 PSI for 30 minutes at a temperature of 240 degrees Fahrenheit. The panel was cooled to 180 degrees Fahrenheit before the pressure was released. The finished composite was mounted in bracket and shot with no backing material with a 9 mm full metal jacket bullet The V-50 of the panel was determined. The V50 of the panel determined to be 1440 ft/sec.

Example 6

This Example is a comparative Example.

A Spectra fabric, Barrday style number 4431, woven with 1200 denier Spectra 900 yarn, was laminated with a 0.35 mil PE film, having the same properties as specified in Example 1. A 16"×16" laminate was fabricated using this laminated fabric by consolidating 15 layers in a heated hydraulic press. The material was pressed at 150 PSI for 30 minutes at a temperature of 240 degrees Fahrenheit. The panel was cooled to 180 degrees Fahrenheit before the pressure was released. The finished composite weighed 0.74 pounds per square foot. The composite was mounted in bracket and shot with no backing material with a 9 mm full metal jacket bullet. The V-50 of the panel was determined. The V50 of the panel was 1214 feet per second. The fabric of this construction is one of the more common Spectra fabrics commercially available.

Example 7

This Example illustrates a yet further embodiment of the invention.

28 layers of a Sentinel fabric woven with 1200 denier Spectra 900 yarn were laminated with 1 layer of 0.35 mil PE film between each layer of fabric. The Spectra yarn and the PE film are the same as in the comparative Example 6. The material was pressed at 150 PSI for 30 minutes at a temperature of 240 degrees Fahrenheit. The panel was cooled to 180 degrees Fahrenheit before the pressure was released. The finished composite weighed 0.68 pounds per square foot. The composite was mounted in bracket and shot with no backing material with a 9 mm full metal jacket bullet. The V-50 of the panel was determined. The V-50 of the panel determined to be 1509 ft/sec. The V-50 of this panel was significantly high than the V-50 of the comparative Example 6, even though the panel weighed 8% less than in the comparative Example 6.

Example 8

This Example is a comparative Example.

12 layers of a Barrday fabric, style 2182, were laminated together with a proprietary Barrday resin system, Black Thermo. The fabric is a plain weave fabric woven from 3000 denier Kevlar 29 yarn. The Black Thermo resin system has a modulus of approximately 1000 psi. The material was pressed at 150 psi for 30 minutes at a temperature of 250 degrees Fahrenheit. The panel was cooled to 180 degrees Fahrenheit before the pressure was released. The pressed panel had a fiber areal density of 1.20 lbs/ft². The finished composite was mounted in a bracket and shot with no backing material with a 9 mm full metal bullet. The V-50 of the panel was determined. The V-50 of the panel was determined to be 1211 feet/second.

Example 9

This Example is a comparative Example.

12 layers of a Barrday fabric, Style 2183, were laminated together with a proprietary Barrday resin system, Black Thermo. The fabric is a plain weave fabric woven from 3000 denier Twaron type 1000 yarn. The Black Thermo resin system has a modulus of approximately 1000 psi. The material was pressed at 150 psi for 30 minutes at a temperature of 250 degrees Fahrenheit. The panel was cooled to 180 degrees Fahrenheit before the pressure was released. The pressed panel had a fiber areal density of 1.20 lbs/ft². The finished composite was mounted in a bracket and shot with no backing material with a 9 mm full metal bullet. The V-50 of the panel was determined. The V-50 of the panel was determined to be 1188 feet/second.

Example 10

This Example illustrates a further embodiment of the invention.

12 layers of a Barrday fabric, Style 2858, were laminated together with 1.75 mils of PE film having a density of 0.92 g/m³. The fabric is a Sentinel fabric woven from 3000 denier Kevlar 29 yarn. The PE film has a tensile modulus in the 25,000 to 29,000 psi range. The material was pressed at 150 psi for 30 minutes at a temperature of 240 degrees Fahrenheit. The panel was cooled to 180 degrees Fahrenheit before the pressure was released. The pressed panel had a fiber areal density of 0.99 lbs/ft². The finished composite was mounted in a bracket and shot with no backing material with a 9 mm full metal bullet. The V-50 of the panel was determined. The V-50 of the panel was determined to be 1440 feet/second. The V-50 of this panel is significantly higher than that of the panels in Example 8 and Example 9 while the areal density of the panel is significantly lower.

SUMMARY OF DISCLOSURE

In summary of this disclosure, the present invention provides a novel ballistic composite with superior ballistic properties. Modifications are possible within the scope of this invention.

What I claim is:

1. A ballistic resistant composite comprising:
   multiple layers of a single ply fabric having unidirectional ballistic resistant yarns in at least two layers in said single ply, the ballistic yarn layers being at 90°±5° with respect to each other, the ballistic resistant yarns being stabilized by being woven with second yarns having a substantially lower tenacity and tensile modulus than the ballistic resistant yarn, the ballistic resistant yarn having a tenacity of at least about 15 grams per denier and a modulus of at least about 400 grams per denier, and
   a resin layer between each pair of such multiple layers adhered to the ballistic resistant yarns but not encapsulating the same and not penetrating the layer of fabric, the resin in the resin layer having a modulus of at least about 7000 psi.

2. The composite of claim 1 wherein the ballistic resistant yarn is selected from the group consisting of aramid fibers, extended chain polyethylene fibers poly(p-phenylene-2,6-benzobisoxazole) (PBO) fibers and glass fibers.

3. The composite of claim 1 wherein the second have a denier in the range of about 20 to about 1000.

4. The composite of claim 1 wherein the second yarns are selected from the group consisting of natural fibers and synthetic fibers.

5. The composite of claim 4 wherein the natural fiber is selected from the group consisting of cotton, wool, sisal, linen, jute and silk.

6. The composite of claim 4 wherein the synthetic fiber is selected from the group consisting of regenerated cellulose, rayon, polynosic rayon, cellulose ester, acrylics, modacrylics, polyamide, polyolefins, polyester, rubber, synthetic rubber and saran.

7. The composite of claim 4 wherein the second yarns are selected from the group consisting of polyacrylonitrile, acrylonitrile-vinyl chloride copolymers, polyhexamethylene adipamide, polycaproamide, polyundecanoamide, polyethylene adipamide, polycaproamide, polyundecanoamide, polyethylene, polypropylene and polyethylene terephthalate.

8. The composite of claim 1 wherein the second yarns are glass.

9. The composite of claim 1 wherein the second yarns have high elongation.

10. The composite of claim 1 wherein the second yarn breaks prior to ballistic resistant yarns on impact of a projectile on the composite.

11. The composite of claim 1 wherein second yarn has a diameter that is up to about 14% of the diameter of the ballistic yarn.

12. The composite of claim 11 wherein the second yarn has a diameter that is about 2.5% of the diameter of the ballistic yarn.

13. The composite of claim 1 wherein the second yarn of the second fabric has a maximum tensile modulus of 1777 grams per tex and a maximum strength at 3% elongation that is 0.31% of the ballistic yarn.

14. The composite of claim 1 wherein the second yarn has a maximum tensile modulus of 1777 grams per tex.

15. The composite of claim 1 wherein the second yarn has a maximum strength at 3% elongation that is 0.31% of the ballistic yarn.

16. The composite of claim 1 wherein the yarn count of the ballistic yarn per inch is about 40 to about 85% of the maximum tightness that can be woven in a plain weave fabric composed entirely of the same size ballistic yarn.

17. The composite of claim 1 wherein the yarn count of the ballistic yarn per inch is 50% plus or minus one % of the maximum tightness that can be woven in a plain weave fabric composed entirely of the same size ballistic yarn.

18. The composite of claim 1 wherein the resin layer is formed of resin having a modulus of about 25,000 to about 30,000 psi.

19. The composite of claim 1 wherein the resin in the resin layer constitutes about 20 wt % or less of the weight of the composite.

20. The composite of claim 1 wherein the resin layer is formed from a film of the resin.

21. The composite of claim 1 wherein the ballistic resistant yarn is formed of polyethylene and the resin layer is formed from a film of low density polyethylene.

22. The composite of claim 21 wherein the low density polyethylene film has a thickness of about 0.35 to 1.75 mil.

* * * * *